July 9, 1929.                    W. B. WESCOTT                    1,720,407
                    BRAKE LINER AND PROCESS OF MAKING THE SAME
                              Filed Jan. 29, 1927
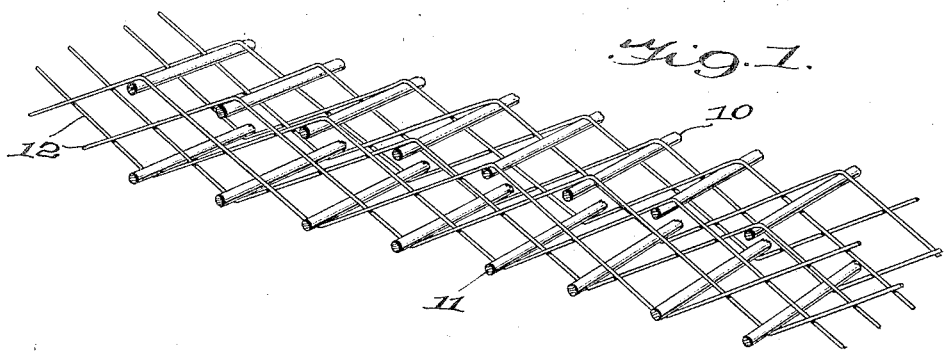
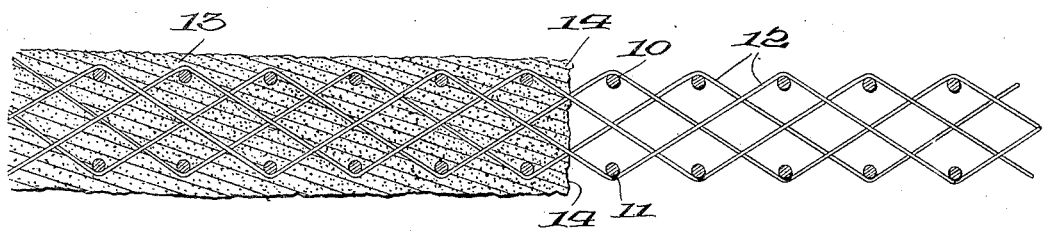
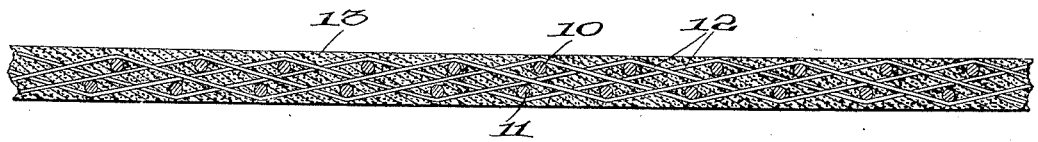
Inventor
WILLIAM BURTON WESCOTT,
by
W. P. McElroy
Attorney Patented July 9, 1929.

1,720,407

UNITED STATES PATENT OFFICE.

WILLIAM BURTON WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS.

BRAKE LINER AND PROCESS OF MAKING THE SAME.

Application filed January 29, 1927. Serial No. 164,647.

This invention relates to brake liners and processes of making the same, and it has particular reference to a brake liner formed by asbestos, wire, and rubber derived from fluid latex; all as more fully hereinafter set forth and as claimed.

Commercial brake liner for automobile brakes and the like purposes is usually made of asbestos with a wire reinforcement. Originally it was made by weaving asbestos covered wire into long narrow strips. Sometimes there was a single ply and sometimes several. This form had a number of advantages, one being that the asbestos being free of permeating matter gave a resilient initial slight compressibility which was advantageous. Various other brake liners have been made of asbestos with various binders; linseed oil, rubber, etc. Sometimes the asbestos is in fabric form and sometimes not. All these liners are open to objection. With frictioned asbestos fabric, since the rubber does not penetrate the asbestos there is no substantial grip on the fibers in the working face, and the rubber faces become exposed during use. With penetrating binders such as linseed oil the whole structure is too rigid.

In the present invention is it my object to produce a brake liner in a simple and methodical way which shall combine the advantages of those of the prior art and be free of their disadvantages. My object is to produce a brake liner without lamination or tendency to cleavage in any direction, which shall carry a maximum amount of asbestos in random arrangement and with the fiber bundles held in and permeated by a rubber binder, the body of rubber being integral throughout the lining strip and being present in amount sufficient to give a slight initial compressibility but not in amount sufficient to give more than a limited compressibility or deformation under load. In my complete article I aim to produce an initial compressibility of about 5 per cent.

In making my improved brake lining I use an open textured wire fabric, using a spaced double weft and single warp to give a lofty fabric with considerable interior space. In making one half inch liner this weave is commonly about 1.5 inches in thickness. The structure is filled with a doughy mixture of asbestos and sulfur in rubber latex diluted with water. The amount of latex, (which commonly carries about 30 per cent rubber) used is sufficient to furnish between 17 and 24 parts rubber to 80 parts asbestos. Enough sulfur is added to the mixture to give the degree of cure subsequently desired. The amount of water used is sufficient to convert the other materials into a plastic dough which can be readily handled. In incorporation, the asbestos should be added progressively to the diluted latex. The dough is forced into the wire fabric so as to give a compound slab 1.5 inches thick. If the rubber in the final article is to be gelled rubber, the slab is next dried in a vacuum drier at a low temperature. The shelf temperature toward the end of the drying should not be above 150° F. Drying should be carried forward until as much water as possible is removed. At this time the slab is a honeycomb exposing an enormous interior surface which permits the degree of drying I want. The warm spongy material coming from the drier is next pressed in any suitable way whereupon the rubber surfaces weld and the rubber becomes an integral body. As latex freely penetrates capillaries this body permeates the fiber bundles.

Most commercial asbestos does not readily mix with latex without coagulation. This power of inducing coagulation may be obviated by a preliminary treatment of the asbestos; the asbestos being subjected to boiling 3 or 4 per cent hydrochloric acid for a few minutes and then washed. After this treatment it no longer coagulates latex. Or, the latex may receive an addition of blood or its constituents to stabilize it against the coagulating action of asbestos.

In the brake liner made under the present invention I find it better as a rule to have the rubber present as gelled rubber; its mechanical properties being better for most purposes. Acid coagulation of the rubber while it may be effected intermediate the production of the compound slab and drying by immersing the slab in 30 per cent acetic acid is not generally as satisfactory. Complete coagulation throughout takes considerable time and moreover resistant metal gauze is needed to withstand the acids. Acid coagulation also produces a coarse reticulate structure with disturbance of sulfur distribution. Where coagulated rubber rather than gelled rubber is wanted it is better to effect coagulation by another expedient; extracting the asbestos with a weaker acid or for a less time, leaving some coagulating power therein. On admixture with latex coagulation will now take place slowly. In this modification the slab is made as before using imperfectly washed asbestos. The slab is allowed to stand before drying. The same result of slow coagulation may be attained in using blood as a protective colloid by reducing the proportion of blood, say, to a point where coagulation of the latex in the asbestos takes place in about 30 minutes; an ample time for application of the dough to the wire. In producing slow coagulation in either of these ways, it is found that the coagulum is not as coarse as that produced by acid.

In the accompanying illustration Fig. 1 is a view of open woven wire fabric; Fig. 2 shows dough and fabric assembled, and Fig. 3 is a view of the finished liner.

As shown in Fig. 1, the fabric is composed of a plurality of pairs of spaced wire warp threads 10 and 11, positioned by means of a number of filler or weft threads 12. This gives considerable amount of interior space to receive the plastic.

In making the dough, rubber latex is diluted with water; the amount of water depending upon the amount and character of the asbestos used. For reasons stated ante, I ordinarily extract the asbestos with acid and wash and dry it before use. This treatment has the advantage that in addition to the removal of the constituents tending to coagulate latex, the fiber is opened up more or less and may be readily freed mechanically of rock fragments and other impurities. Instead of using acid treated asbestos, protective colloids may be added to the latex to enable the use of commercial asbestos. Commercial latex contains about 30 per cent rubber and the amount should be sufficient to furnish 17 to 24 per cent of rubber on the final material. With 80 parts of asbestos, this will correspond to 57 to 80 parts of latex. Sulfur and accelerator may be added to take care of subsequent vulcanization. The asbestos should be stirred in the diluted latex until a stiff dough is formed. The latex quickly penetrates the asbestos fibers in this treatment.

A sufficient amount of dough is pressed into the wire fabric to fill it and give a surfacing layer 14 on each side (see Fig. 2). At this stage the article is a thick mass or dough 13 including the wire reinforcement and having the fibers in random arrangement. These fibers are indicated by the stippling in Fig. 2.

At this stage the rubber is still present as latex. Solid rubber is next produced from the latex. This may be done by coagulation, the strip being immersed in a 30 per cent solution of acetic acid. This instantly produces a surface coagulation; the material skins over with coagulated rubber. Within this outer layer coagulation proceeds but rather slowly so that for complete coagulation the material must be allowed to remain wet with acid for some hours. After complete coagulation the strip may be given a light pressure to rupture the surface layer and allow expulsion of the contained liquid. It may be pressed, sprayed repressed and sprayed and so on until as much washing as desired is achieved.

Where gelling is desired, after pressing the dough into the fabric the whole mass is simply put into a vacuum drier and dried at a low temperature until the moisture content has been reduced as far as possible. Articles with coagulation rubber are treated in the same way. While the temperature in the vacuum dried at first may be high it should not be more than 150° F. on the shelves toward the end of the drying. After drying is effected the material will have the apparent size shown in Fig. 2 but it will now be a highly porous or honeycomb structure. The rubber is now represented by films enclosing and permeating the asbestos. The extensive surfaces of rubber permit effective drying of the character indicated. On pressing the warm dry porous material the rubber surfaces weld together and give a material of the general structure shown in Fig. 3. Heavy pressure is required to effect complete elimination of the interstices. In this compression the wire fibers move closer together with lateral extension. At this stage the material is virtually a body of uncured rubber enclosing the wire skeleton and the asbestos fibers. The material is next vulcanized, using the ordinary means and methods. Compacting and vulcanization may be performed in the same piece of apparatus but I find it better to compact by special apparatus.

Material made as stated while having a variety of uses, is particularly adapted for use as lining material for automobile brake drums. It has a high resistance to deterioration by heat, a high tensile strength, and it withstands to a marked degree the severe loads to which brake linings are subjected. Brake liners of the same type may be made by employing cotton fiber in lieu of asbestos but this I do not regard as being so advantageous. In using short cotton fiber the procedure is exactly the same as previously indicated save that more of the diluted latex must be employed in mixing. Otherwise, cotton fibers curl up and become orientated. After making the mixture of cotton with diluted latex, the excess can be removed by draining. After this the procedure is as previously given. In using cotton fiber comminuted tire scrap may be employed. This carries some rubber which in subsequent operations becomes integral with the rubber from the latex.

What I claim is:

1. An article of manufacture comprising a base of wire fabric, a body of asbestos fibers disposed in random arrangement therearound, and an integral binder holding and permeating said fibers, said binder including rubber derived in situ from latex.

2. A brake liner exhibiting an initial free and resilient compressibility and composed of an integral body of gelled rubber derived in situ from latex, said body of rubber including and permeating asbestos fibers dispensed in random arrangement and also including a wire reinforcement.

3. The method of making a composite fabric which comprises forming an open mesh wire fabric, filling the fabric thereof with a doughy composition of fiber and dilute latex, drying, compressing the spongy dried material to the desired thickness to weld the rubber films together and vulcanizing the assembly thus formed.

4. An article of manufacture comprising a base of wire fabric in interlocking arrangement with a compound body of asbestos fibers and rubber, said rubber being an integral mass holding and permeating said fibers and said body having a slight initial resilient free compressibility.

In testimony whereof, I have hereunto affixed my signature.

WILLIAM BURTON WESCOTT.